(12) United States Patent
Feller

(10) Patent No.: US 8,544,342 B1
(45) Date of Patent: Oct. 1, 2013

(54) VORTEX FLOWMETER

(71) Applicant: Murray F Feller, Micanopy, FL (US)

(72) Inventor: Murray F Feller, Micanopy, FL (US)

(73) Assignee: Onicon, Inc., Clearwater, FL (US)

( * ) Notice: Subject to any disclaimer, the term of this patent is extended or adjusted under 35 U.S.C. 154(b) by 0 days.

(21) Appl. No.: 13/675,663

(22) Filed: Nov. 13, 2012

(51) Int. Cl.
 *G01F 1/32* (2006.01)
(52) U.S. Cl.
 USPC ........................................... 73/861.24
(58) Field of Classification Search
 USPC .............................. 73/861.24, 861.22, 861.23
 See application file for complete search history.

(56) References Cited

U.S. PATENT DOCUMENTS

| | | | |
|---|---|---|---|
| 3,886,794 A | 6/1975 | McShane | |
| 4,297,898 A | 11/1981 | Herzl | |
| 4,457,181 A | 7/1984 | Marsh | |
| 4,703,659 A * | 11/1987 | Lew et al. | 73/861.24 |
| 5,728,947 A | 3/1998 | Marsh et al. | |
| 5,736,649 A * | 4/1998 | Kawasaki et al. | 73/861.23 |
| 6,058,787 A * | 5/2000 | Hughes | 73/861.63 |

\* cited by examiner

*Primary Examiner* — Jewel V Thompson
(74) *Attorney, Agent, or Firm* — David Kiewit

(57) ABSTRACT

A vortex flowmeter has a flow conditioning structure entirely inside a flow tube and an externally mounted pair of ultrasonic transducers for detecting vortices generated by vortex shedding structures within the flow tube. The flow conditioning structure can be installed within a short flow tube section retaining the shedder and providing a flow passage having a desired shape. The use of external transducers, coupled with a selectable flow conditioning structure allows many calibration and maintenance tasks to be performed without having to shut down flow and access the passive components inside the tube.

12 Claims, 4 Drawing Sheets

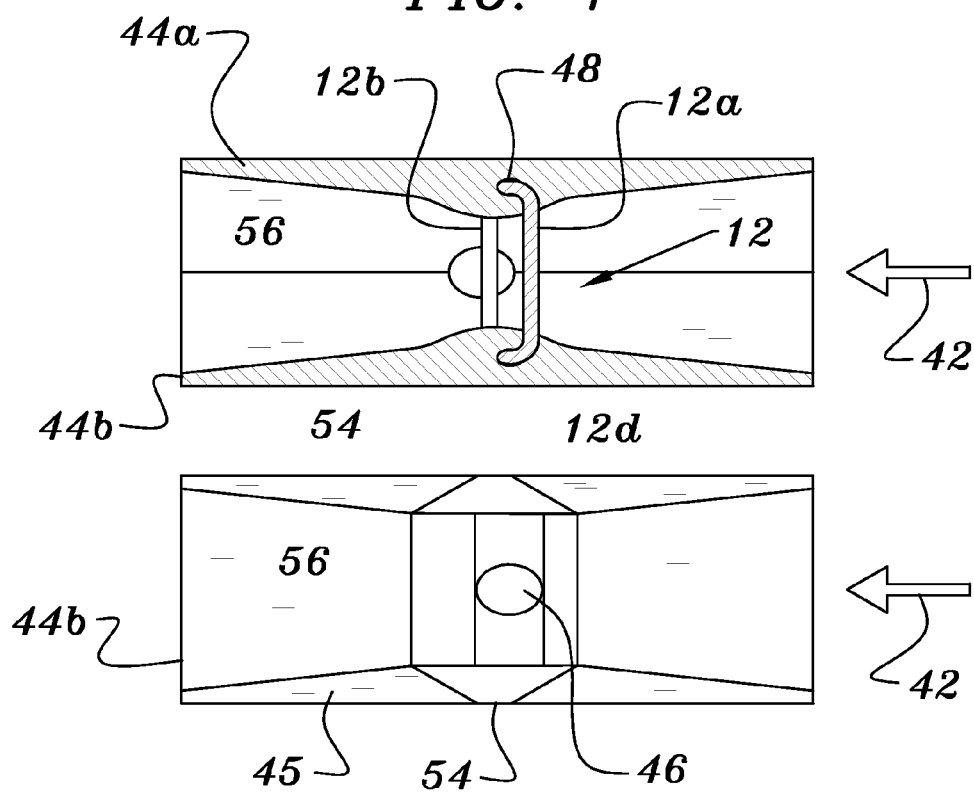

VORTEX FLOWMETER

BACKGROUND OF THE INVENTION

The invention provides apparatus for measuring fluid flow by acoustically detecting the rate at which vortices are generated by vortex shedding bodies disposed in the fluid.

BACKGROUND INFORMATION

Vortex flowmeters using externally mounted ultrasonic transducers to detect a rate of vortex generation are known in the art and have been discussed by Marsh et al in U.S. Pat. No. 4,457,181 and U.S. Pat. No. 5,728,947, by McShane in U.S. Pat. No. 3,886,794 and by Herzl in U.S. Pat. No. 4,297,898, inter alia.

In a vortex meter using external ultrasonic transducers the transducers are preferably simultaneously energized in the transmitting mode with signals of the same magnitude that are 180 degrees out of phase. Each transducer then receives the signal generated by the other one. These received signals are also 180 degrees out of phase except for the relatively small deviations caused by the action of the vortices. The small deviations are amplified and phase detected to determine the rate of vortex generation and thereby provide signals representative of the fluid flow rate. An example of the circuitry usable for this is shown in the inventor's pending application Ser. No. 13/235,696, the disclosure of which is herein incorporated by reference.

BRIEF SUMMARY OF THE INVENTION

One aspect of the invention is that it provides a vortex flowmeter comprising: an internal flow conditioning structure retaining a vortex shedder; and a pair of ultrasonic transducers for measuring the rate of vortex generation. These transducers may face each other across the flow tube along an acoustic path extending through windows formed in the flow conditioning structure.

In a preferred embodiment the flow tube is not penetrated by any of the flow metering apparatus: The flow conditioning and vortex generating portions, which are unlikely to require maintenance or repair, are entirely inside the flow tube. The maintainable portions, such as the ultrasonic transducers and signal processing electronics are external to the tube where they are easily accessible without interrupting fluid flow.

Another aspect of the invention is that it provides a vortex flowmeter having a pair of ultrasonic transducers external to a flow tube. These transducers are preferably retained in a saddle block or other housing strapped or clamped against an outer surface of the flow tube. Each transducer is spring-biased into acoustic contact with the outer wall of a flow tube. The spring can be chosen to provide a selected respective force independent of any force exerted by a strap or clamp arrangement.

In a preferred embodiment the ultrasonic transducers used for detecting the flow variations resulting from generation of the vortices are mounted in a saddle fitted on the outside of the tube and held in place with a hose clamp or other strap arrangement. The saddle may also contain supporting electronics which can alternately be remotely located.

Yet another aspect of the invention is that it provides a vortex flowmeter comprising: a vortex shedder structure; a flow conditioning structure internal to a flow tube, elongated along a flow direction and comprising two windows defining a throughhole transverse to the flow axis; and a pair of ultrasonic transducers in respective acoustic contact with an external surface of the flow tube so as to define an acoustic path between them. This acoustic path preferably extends transverse to the flow direction and through the throughhole in the flow conditioning structure. In this arrangement the vortex shedder structure is retained by the flow conditioning structure so that the shedder bars are transverse to the flow direction. The flow conditioning structure itself is retained within the flow tube.

A preferred flow tube structure forming the meter's flow conduit is a simple tube into which are inserted flow conditioning and vortex shedding elements. These elements may be of several different sizes to enable such a tube to be used to measure a wide range of flow rates. Flow conditioning includes the ability to control the fluid velocity in the cross section of the tube in the vicinity of the shedding elements.

Installation of the metered flow tube section requires the interruption of the fluid flow unless fluid bypass means are available. This is the primary disadvantage of the invention compared to the ultrasonic transit-time meter using clamp-on transducers. However, once installation is made, the saddle containing the transducers and electronics is the only part likely to fail in operation and is easily field replaceable without interrupting flow or affecting calibration.

With the exception of the initial installation, the vortex flowmeter of the present invention is generally more cost effective and reliable, and easier to service than a comparable transit-time flowmeter.

Those skilled in the art will recognize that the foregoing broad summary description is not intended to list all of the features and advantages of the invention. Both the underlying ideas and the specific embodiments disclosed in the following Detailed Description may serve as a basis for alternate arrangements for carrying out the purposes of the present invention and such equivalent constructions are within the spirit and scope of the invention in its broadest form. Moreover, different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

FIG. 4 is a longitudinal cross-section of a flow conditioning structure of the invention retaining a shedder structure lying within the plane of section.

FIG. 5 is a plan view of a portion of the flow conditioning structure of FIG. 4.

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most, instances such definitions apply both to preceding and following uses of such defined words and phrases.

Figure 1:
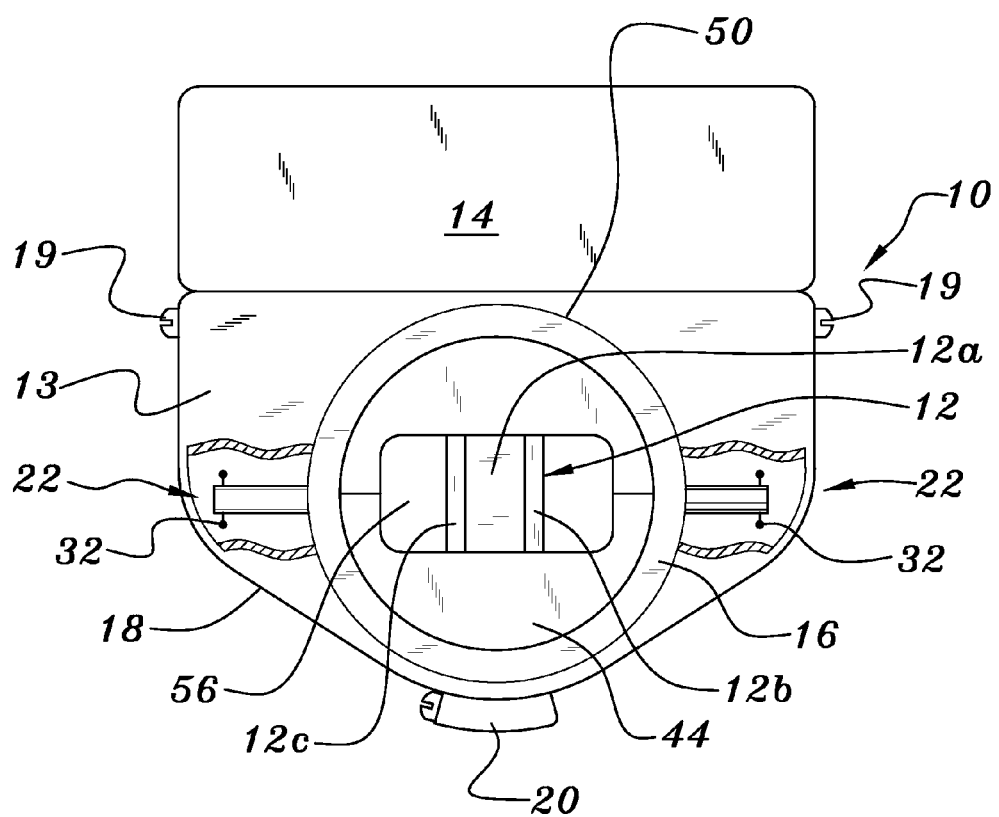
FIG. 1 is an end view, looking downstream, of a flowmeter of the invention mounted on a flow tube section.

Turning now to FIG. 1, one finds an end view, looking downstream, of a preferred vortex flowmeter 10 of the invention. The flowmeter 10 comprises a saddle block 13 attached to a supporting electronics enclosure 14 mounted on a flow tube 16 by means of a strap 18 fastened to the saddle block 13 by a suitable fastener 19 and tightened by a screw arrangement 20. The saddle block 13 retains a pair of transducer assemblies 22 which provide acoustic and electrical contact between the respective piezoelectric transducer elements 24 and the tube 16.

Figure 2:
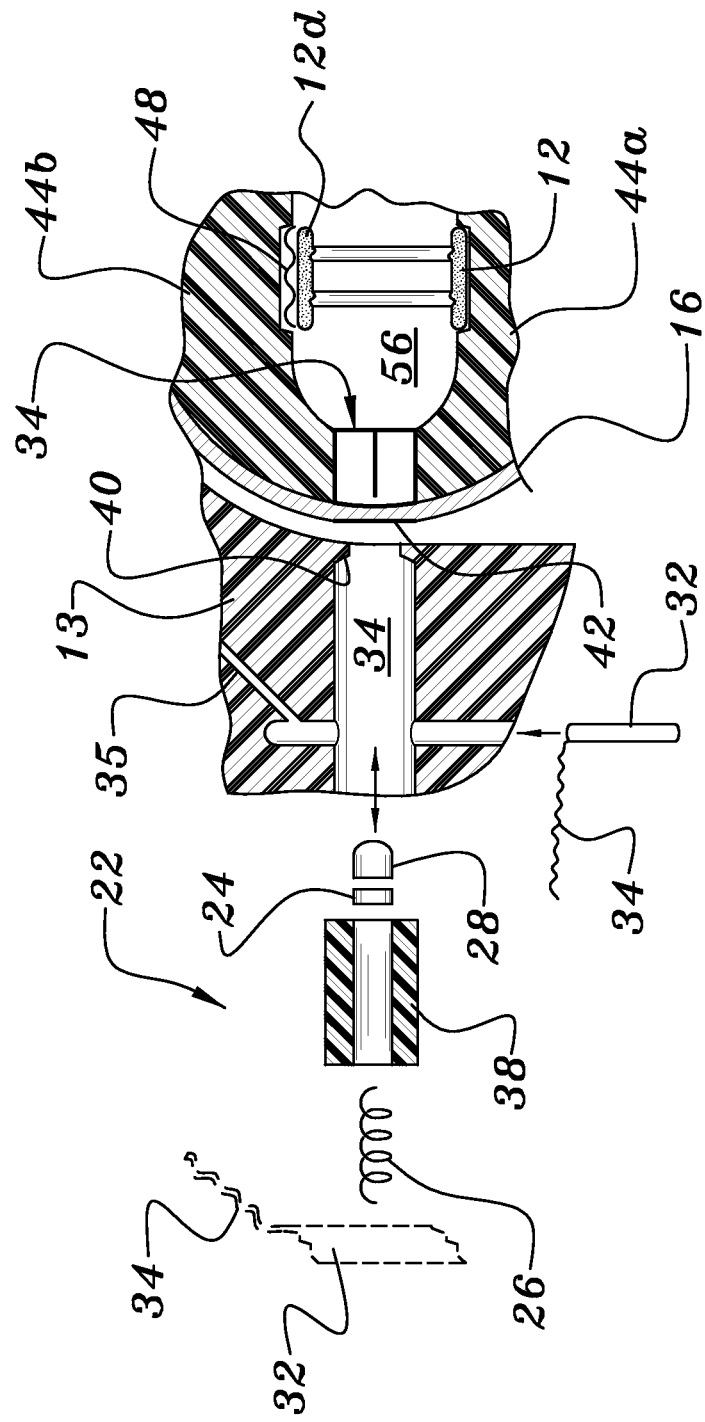
FIG. 2 is a partly exploded partially sectional detail view of one of two transducer assemblies of the invention and a saddle block in which they are installed.

A preferred vortex shedder structure 12 comprises an upstream shedder bar or bluff body 12a and a pair of downstream shedder bars or bluff bodies 12b, 12c. The bluff bodies are preferably joined, for convenience in mounting, by an end portion 12d, as depicted in FIG. 2. The operation and advantages of this particular structure are taught by the inventor in his U.S. patent application Ser. No. 13/235,696, the disclosure of which is herein incorporated by reference. The reader will recognize that many other bluff body configurations are known in the art and could be used with the other features of the present invention.

Figure 3:
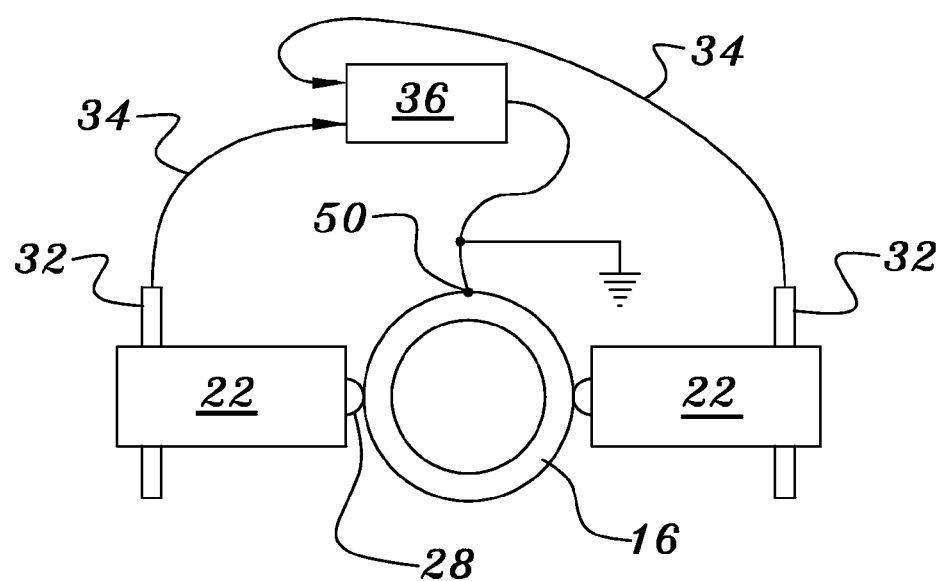
FIG. 3 is a schematic detail view depicting electrical connections of one of the transducers.

A more detailed view of a preferred transducer assembly 22 is shown in FIG. 2. It preferably comprises a sleeve 38 into which the transducer element 24 and acoustic concentrator 28 are fitted for piston-like motion therewithin. A preferred piezoelectric element 24 is a wafer or thin bisc having separate electrodes on each of its faces and is pressed by a metal spring 26 against an electrically conductive acoustic energy concentrator 28, which in turn is pressed into acoustic contact with the outside wall of a flow tube 16, an arrangement that may call for the use of an acoustic coupling compound. The concentrator reduces the contact area at the tube surface and thereby increases the pressure to yield better acoustic and electrical contact between the element and the tube. If the tube 16 is electrically conducting, the contact may be electrical as well as acoustic. If the flow tube is not electrically conducting, a thin electrically conductive strip, which may be a metallic coating on the tube, can be introduced between the concentrator 28 and the flow tube 16, or an additional wire (not shown) can be employed to make electrical contact to the transducer element. The conductive tube or the alternative conductor is preferably connected to the ground point of the supporting electronics 36, as schematically depicted In FIG. 3, via a rigid or spring-loaded terminal 50 built into the saddle 13.

In a preferred embodiment the signal processing electronics are connected to the transducer 24 by a metallic spring 26, which contacts a pin 32 having a wire 34 passing through a conduit 35 in the saddle block 13 to connect to the signal processing electronics 36. As indicated by the phantom depiction in FIG. 2, the pin 32 also preferably serves to retain the sleeve 38, spring 26, transducer 24 and concentrator 28 within a housing such as the mounting cavity 39 in the saddle block 13.

The reader will recognize that the invention is not limited to housings that are cavities formed in a saddle block. There are many other ways to provide a housing that retain a transducer assembly even when the housing is not clamped against a flow tube and that can be held against a flow tube without forcing the transducer assembly against the tube. The word 'housing' as used herein is intended to cover all such structural arrangements.

The sleeve portion 38 of the transducer assembly 22 is preferably pressed by the spring 26 against a lip 40 portion of the saddle 13 in order to retain the acoustic concentrator whenever the saddle is not holding it against a tube. The housing or mounting cavity is sized to enable a degree of movement of the concentrator and element so that the concentrator is kept aligned with and in intimate contact with the flow tube 16, which may have a flattened portion 41. In some embodiments the sleeve is adhesively bonded around the concentrator 28 and piezoelectric element 24 to form an effective piston that can slide freely within the mounting cavity 39 cut into the saddle block 13.

The reader will appreciate that arrangements other than the presently preferred one could be used to provide electrical contacts to the transducer while biasing that transducer against a flow tube by a spring, where the contact force is set by the properties of that spring.

One can also adhesively bond the transducer (with or without an associated concentrator) to the tube. This may provide either a direct electrical contact to the tube or an indirect one in which the concentrator is bonded to a flow tube by means of a conductive adhesive, such as silver-filled epoxy. In these cases one can use a spring within the saddle block or other housing to electrically contact the piezoelectric element.

The depicted strap 18 and screw 20 arrangement enables the strap to force the saddle 13 against the tube 16 to make stable mechanical and electrical connections. Although the preferred design employs a saddle 13 to position the transducer assemblies, the clamping arrangement need not provide mechanical contact between the transducer and the flow tube as long as the concentrator protrudes outward from the housing far enough to make that contact. The reader will recognize that many other arrangements could be considered that clamp a housing against a flow tube without simultaneously determining the force with which the transducer itself is pushed against the tube. The preferred housing design provides that this clamping force does not affect the force holding the transducer 24 and concentrator 28 against the pipe 16. That load is determined by a choice of the spring 26, which determines the biasing force on the transducers. The reader should note that although the depicted strap and screw arrangement is preferred, many other tensile fasteners, such as a spring (not shown) or alternate clamping arrangements could be used to mount the transducer housings.

A preferred embodiment of the invention comprises a flow conditioning structure 44, depicted in FIGS. 4 and 5, retained within the flow tube 16 and retaining the shedder structure 12. A preferred flow conditioning structure comprises two members 44a, 44b mated along surfaces 45 parallel to the flow axis and having mounting holes 46 for retaining the shedder 12. In a particular preferred embodiment the flow conditioning structure is assembled with a spring element 48, such as the wave washer depicted in FIGS. 2 and 4, before being inserted into the flow tube 16. This arrangement can bias the outer surface of the flow conditioning structure 44 into contact with the inner surface of the flow tube 16 with sufficient force to retain the flow conditioning structure 44 at a fixed position along the flow tube 16. Alternate methods of fixing the axial position of the flow conditioning structure can also be employed. These comprise, without limit, adhesive bonding, a size choice ensuring a press fit, retention fittings, such as an inset ring or a groove or flat formed in the tube.

In a preferred embodiment the axial and rotational position of the flow conditioning structure 44 within the flow tube 16 is controlled in order to ensure that an acoustic path between the transducer assemblies 22 passes through windows 54 formed in the flow conditioning structure 44. In the ideal case, this provides an acoustic beam perpendicular to both the flow 42 and the elongation axis of the shedder 12. It should be recognized that in a comparable transit time flow meter (e.g., absent the shedder) this sort of alignment would be critical. Here, where the acoustic sensors are employed in measuring vortex generation rates, the alignment is much less critical. In fact, flow sensing could be accomplished without the openings 54, albeit acoustic signal attenuation would be much greater, thus diminishing the meter's ability to reject ambient electrical noise, and introducing acoustic reflections which might inhibit the detection of the desired flow representing signals.

The cross-sectional shape of a flow passage 56 may be changed for a given flow tube size so that the same electronics and transducers can be used over a much wider volumetric flow range. For example, the height of the passage 56 can be changed to modify the cross sectional area through which the fluid flows, thereby providing the flow range control.

Note that the flow conditioning structure 44 preferably continuously covers the inner diameter of the flow tube with the exception of the flow passage 56 in order to provide for an uninhibited acoustic sensing path to measure the fluid flow rate. Because the flow conditioning structure members 44a, 44b contact each other along most of their length, they can be compressed against and/or attached to each other or be made together as a single piece. The inner surface of the flow conditioning structure preferably provides a rectangular shape to the flow passage 56.

Although the present invention has been described with respect to several preferred embodiments, many modifications and alterations can be made without departing from the invention. Accordingly, it is intended that all such modifications and alterations be considered as being within the spirit and scope of the invention as defined in the attached claims.

The invention claimed is:

1. A vortex flowmeter for measuring flow of a fluid along an axis of a flow tube, the flowmeter comprising:
 a flow conditioning structure having an outer surface abutting an inner surface of the flow tube and an inner surface defining a passage for fluid flow along the axis, the flow conditioning structure further comprising two windows facing each other across the axis;
 a vortex shedder structure comprising at least one elongated shedder bar retained in the flow conditioning structure transverse to the flow axis; and
 a pair of ultrasonic transducers facing each other across the axis so as to define an acoustic path therebetween, the acoustic path extending through the windows in the flow conditioning structure.

2. The vortex flowmeter of claim 1 wherein the flow conditioning structure is biased against the inner surface of the flow tube by a spring disposed between an end portion of the shedder structure and a portion of the flow conditioning structure.

3. The vortex flowmeter of claim 1 wherein the flow conditioning structure is adhered to the inner surface of the flow tube.

4. The vortex flowmeter of claim 1 wherein the transducers are in acoustic contact with respective flat portions of an external surface of the flow tube, and the transducers are aligned with the windows.

5. The vortex flowmeter of claim 1 wherein the flow conditioning structure comprises two cooperating members.

6. A vortex flowmeter operable to measure flow in a flow tube by generating vortices by means of a shedder structure and detecting those vortices using a pair of ultrasonic transducers assemblies external to the flow tube, the vortex flowmeter comprising:
 at least one strap; and
 a saddle block forced against an outer surface of the flow tube by the strap, the saddle block retaining the transducer assemblies in a facing relationship across the flow tube, each transducer assembly comprising a respective spring biasing an associated piezoelectric element into acoustic contact with the outer wall of the flow tube by a selected respective force independent of any force exerted by the at least one strap.

7. The vortex flowmeter of claim 6 wherein each transducer assembly comprises a respective acoustic concentrator directly abutting the flow tube.

8. The vortex flowmeter of claim 6 wherein each transducer assembly comprises a respective electrically conductive acoustic concentrator having a first of two ends in electrical contact with the associated piezoelectric element and the second of two ends in mechanical and electrical contact with the outer wall of the flow tube.

9. The vortex flowmeter of claim 6 wherein each transducer assembly comprises a respective electrically conductive acoustic concentrator having a first of two ends in electrical contact with the associated piezoelectric element and the second of two ends clamping an electrically conductive strip against the outer wall of the flow tube.

10. The vortex flowmeter of claim 6 wherein the saddle block comprises a surface conformed to the outer surface of the flow tube and held in contact therewith by the at least one strap.

11. A vortex flowmeter comprising:
 a vortex shedder structure comprising at least one elongated shedder bar;
 a flow conditioning structure elongated along a flow direction and retaining the vortex shedder structure so that the at least one elongated shedder bar is transverse to the flow direction, the flow conditioning structure comprising a throughhole transverse to both the flow direction and the elongated member;
 a flow tube retaining the flow conditioning structure therewithin, the flow tube connectable to a source of flowing fluid; and
 a pair of ultrasonic transducers in respective acoustic contact with an external surface of the flow tube so as to define an acoustic path therebetween, the acoustic path extending transverse to the flow direction and through the throughhole in the flow conditioning structure.

12. The flowmeter of claim 11 wherein the flow conditioning structure comprises two members cooperating to form the throughhole.

* * * * *